United States Patent Office 2,996,501
Patented Aug. 15, 1961

2,996,501
SYNTHETIC PENICILLINS
Frank Peter Doyle, 42 Hillside Gardens, Betchworth, and John Herbert Charles Nayler, Coombelea, Cliftonville, Dorking, England
No Drawing. Filed Apr. 10, 1961, Ser. No. 108,979
Claims priority, application Great Britain Mar. 31, 1960
7 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases, caused by Gram-positive bacteria and, more particularly, relates to novel isoxazole penicillins and nontoxic salts thereof.

This application is a continuation-in-part of our prior copending application Serial No. 64,737, filed October 25, 1960, and now abandoned.

Antibacterial agents such as benzylpenicillin have proved highly effective in the past in the therapy of infections due to Gram-positive bacteria, but such agents suffer from the serious drawbacks of being unstable in aqueous acid, e.g., upon oral administration, and of being ineffective against numerous so-called resistant strains of bacteria, e.g., penicillin-resistant strains of *Staphylococcus aureus* (*Micrococcus pyogenes* var. *aureus*). In addition, benzylpenicillin is not an effective agent against many bacteria which produce penicillinase. Many of the compounds of the present invention, in addition to their potent antibacterial activity, exhibit resistance to destruction by acid or by penicillinase or are effective against benzylpenicillin-resistant strains of bacteria or inhibit benzylpenicillinase and thus potentiate the action of benzylpenicillin when admixed therewith and are safe for use in patients who cannot be given benzylpenicillin because they exhibit allergic reactions thereto.

There is provided, according to the present invention, a member selected from the group consisting of an acid having the formula

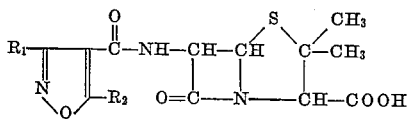

wherein $R_1$ and $R_2$ each represent a member selected from the group consisting of (lower)alkyl, (lower)alkylthio, cyclohexyl, cyclopentyl, cycloheptyl, aralkyl (including benzyl, α- and β-phenethyl, styryl and α- and β- and γ-phenylpropyl, etc.), aryl [including phenyl, chlorophenyl, bromophenyl, (lower)alkylphenyl, (lower)alkoxyphenyl, etc.] and aralkythio; and nontoxic salts thereof, including nontoxic metallic salts such as sodium, potassium, calcium and aluminum, the ammonium salt and substituted ammonium salts, e.g., salts of such nontoxic amines as trialkylamines, including triethylamine, procaine, dibenzylamine, N-benzyl-beta-phenethylamine, 1-ephenamine, N,N' - dibenzylethylenediamine dehydroabietylamine, N,N'-bis-dehydroabietylethylenediamine, N-(lower)alkylpiperidines, e.g., N-ethylpiperidine, and other amines which have been used to form salts with benzylpenicillin.

The term "(lower)alkyl" as used herein means both straight and branched chain aliphatic hydrocarbon radicals having from one to ten carbon atoms such as methyl, ethyl, propyl, isopropyl, butyl, isobutyl, t-butyl, amyl, hexyl, 2-ethylhexyl, heptyl, decyl, etc. Similarly, where the term "(lower)" is used as part of the description of another group, e.g., "(lower)alkoxyphenyl," it refers to the alkyl portion of such group which is therefore as described above in connection with "(lower)alkyl." The term "aryl" as used herein refers to the phenyl radical per se and to substituted phenyl radicals of the formula

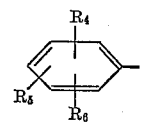

wherein $R_4$, $R_5$ and $R_6$ each represent a member selected from the group consisting of hydrogen, fluoro, chloro, bromo, iodo, trifluoromethyl, (lower)alkyl, (lower)alkoxy, nitro, methylsulfonyl, cyano, di(lower)alkylamino and methylmercapto. Also included within the scope of the present invention are easily hydrolyzed esters which are converted to the free acid form by chemical or enzymatic hydrolysis. A preferred embodiment of the present invention is the class of compounds having the formula set forth above in which one of the groups $R_1$ and $R_2$ is an unsubstituted phenyl group or a substituted phenyl group, preferably chlorophenyl, and the other is a lower alkyl group. Another preferred embodiment is the class of compounds in which both $R_1$ and $R_2$ are lower alkyl groups.

The products of the present invention are prepared by reaction of 6-aminopenicillanic acid, preferably in the form of a neutral salt such as the sodium salt or the triethylamine salt, with an acid chloride having the formula:

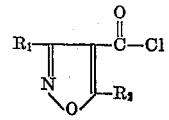

wherein $R_1$ and $R_2$ have the meaning set forth above, or its functional equivalent as an acylating agent for a primary amino group. Such equivalents include the corresponding carboxylic acid bromides, acid anhydrides and mixed anhydrides with other carboxylic acids, including monoesters, and particularly lower aliphatic esters, of carbonic acid.

Thus, an elegant procedure for preparing a compound of the present invention by way of a mixed anhydride with ethoxy- or isobutoxy-carbonic acid comprises mixing 0.01 mole of an acid (whose acid chloride is set forth above), 0.01 mole isobutyl chloroformate and 0.011 mole tertiary hydrocarbonyl or aliphatic amine such as triethylamine in an anhydrous, inert and preferably water-miscible solvent such as p-dioxane (e.g., 20 ml.) and if desired 2 ml. pure, dry acetone for about thirty minutes in the cold, e.g., at about 4° C. To this solution of the mixed anhydride there is then added a chilled solution of 0.01 mole 6-aminopenicillanic acid and 0.01 mole tertiary hydrocarbonyl amine, e.g., triethylamine, in, for example, 20 ml. of solvent such as water. The reaction mixture is stirred for a period of an hour or so to form the substituted ammonium salt of the desired product. The mixture may then, if desired, be extracted at alkaline pH such as pH 8; aqueous sodium bicarbonate may be used, for example, if necessary to adjust the pH with a water-immiscible solvent such as ether to remove unreacted starting materials. The product in the aqueous phase is then converted to the free acid, preferably in the cold under a layer of ether by the addition of dilute mineral acid, e.g., 5 N $H_2SO_4$ to pH 2. The free acid is then extracted into a water-immiscible, neutral organic solvent such as ether and the extract is washed with water quickly in the cold, if desired, and dried, as with anhydrous $Na_2SO_4$. The product in the ethereal extract in its free acid form is then converted to any desired metal or amine salt by treatment with the appropriate base, e.g., a free amine such as procaine base or a solution of potassium 2-ethylhexanoate in dry n-butanol. These salts are usually insoluble in solvents such as ether and can be recovered in pure form by simple filtration.

Another method of preparing an ethereal solution of the acid form of a compound of the present invention comprises preparing a solution in 20 ml. water of 0.00463 mole 6-aminopenicillanic acid and 1.56 gm. sodium bicarbonate, adding 0.00476 mole of an acid chloride whose formula is set forth above and shaking vigorously at room temperature, e.g., for twenty to sixty minutes. The mixture is then extracted with ether to remove unreacted or hydrolyzed starting materials. The solution is then acidified (preferably in the cold) to pH 2, as with dilute sulfuric acid, and the free acid form of the product is extracted into ether (e.g., two portions of 25 ml.). This ethereal extract is dried, as with anhydrous sodium sulfate, and the drying agent is removed to leave a dry ethereal solution from which the product is easily isolated, preferably in the form of an ether-insoluble salt such as the potassium salt. This procedure is used when the acid chloride reacts with a primary amine more rapidly than it does with water, as determined by simple test. In this procedure the acid chloride may be replaced by an equimolar amount of the corresponding acid bromide or acid anhydride.

Since some of the antibiotic substances obtained by the process of this invention are relatively unstable compounds which readily undergo chemical changes resulting in the loss of an antibiotic activity, it is desirable to choose reaction conditions which are sufficiently moderate to avoid their decomposition. The reaction conditions chosen will, of course, depend largely upon the reactivity of the chemical reagent being used. In most instances, a compromise has to be made between the use of very mild conditions for a lengthy period and the use of more vigorous conditions for a shorter time with the possibility of decomposing some of the antibiotic substance.

The temperature chosen for the process of preparation of the derivatives of penicillanic acid should in general not exceed 30° C. and in many cases a suitable temperature is ambient temperature. Since the use of strongly acid or alkaline conditions in the process of this invention should be avoided, it has been found preferable to perform the process at a pH of from 6 to 9, and this can conveniently be achieved by using a buffer, for example, a solution of sodium bicarbonate, or a sodium phosphate buffer. In addition to the use of aqueous media for the reaction, including filtered fermentation broths or aqueous solutions of crude 6-aminopenicillanic acid, use can be made of organic solvents which do not contain reactive hydrogen atoms. Examples of such inert solvents are dimethylformamide, dimethylacetamide, chloroform, acetone, methyl isobutyl ketone and dioxane. Frequently, it is highly satisfactory to add an aqueous solution of a salt of 6-aminopenicillanic acid to a solution of the acylating agent in an inert solvent and preferably in an inert solvent which is miscible with water, such as acetone or dimethylformamide. Vigorous stirring is, of course, advisable when more than one phase is present, e.g., solid and liquid or two liquid phases.

At the conclusion of the reaction, the products are isolated, if desired, by the techniques used with benzylpenicillin and phenoxymethylpenicillin. Thus, the product can be extracted into diethyl ether or n-butanol at acid pH and then recovered by lyophilization or by conversion to a solvent-insoluble salt, as by neutralization with an n-butanol solution of potassium 2-ethylhexanoate, or the product can be precipitated from aqueous solution as a water-insoluble salt of an amine or recovered directly by lyophilization, preferably in the form of a sodium or potassium salt. When formed as the triethylamine salt, the product is converted to the free acid form and thence to other salts in the manner used with benzylpenicillin and other penicillins. Thus, treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g., procaine, by reaction with the amine base. Salts so formed are isolated by lyophilization or, if the product is insoluble, by filtration. A particularly elegant method of isolating the product as a crystalline potassium salt comprises extracting the product from an acidic, aqueous solution (e.g., pH 2) into diethyl ether, drying the ether and adding at least one equivalent of a solution of potassium 2-ethylhexanoate (e.g., 0.373 gm./ml.) in dry n-butanol. The potassium salt forms, precipitates, usually in crystalline form, and is collected by filtration or decantation.

6-aminopenicillanic acid is prepared according to Batchelor et al. (Nature 183, 257–258, January 24, 1959), or Belgian Patent 569,728.

Aqueous acetone is often a convenient solvent for the reaction, but anhydrous organic solvents together with an organic base may also be employed. Both solvent and base should be chosen so as not, themselves, to react preferentially with the reagent being employed. Acetone and triethylamine or chloroform and triethylamine have been found to be particularly useful.

The 3,5-disubstituted-4-isoxazolecarboxylic acids used as starting materials in the present invention are prepared as reported in the literature or by the use of the methods reported therein for similar compounds, e.g., see Rodd, Chemistry of Carbon Compounds, IV$^A$, Elsevier Publishing Company, New York, 1957, pages 334–342;

Elderfield, Heterocyclic Compounds, John Wiley and Sons, Inc., vol. 5, chapter 7;

Chemical Abstracts, 32, 2117[7], 2117[9]; 40, 4673[1]; 52 9075c; 41, 2416, 2417; 47, 12356;

J. Amer. Chem. Soc., 67, 132, 134, 138; 65, 1070; and Beilstein, 27, 317, 324; I 379; II 383.

One procedure which is highly advantageous because it leads to products of unequivocal structure and because of the ready availability of the basic starting materials (aldehydes, including substituted benzaldehydes and aliphatic aldehydes, and beta-keto esters such as ethyl acetoacetate and ethyl benzoylacetate) is illustrated by the following preparation of 5-methyl-3-phenyl-4-isoxazolecarboxylic acid.

PROCESS FOR THE PREPARATION OF 5-METHYL-3-PHENYL-4-ISOXAZOLECARBOXYLIC ACID (V)

(A)
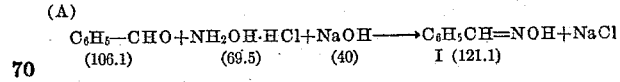
$C_6H_5$—CHO + $NH_2OH·HCl$ + NaOH ⟶ $C_6H_5CH$=NOH + NaCl
(106.1)      (69.5)           (40)          I (121.1)

(B)
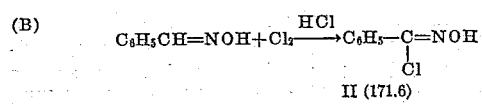
$C_6H_5CH$=NOH + $Cl_2$ $\xrightarrow{HCl}$ $C_6H_5$—C=NOH
                                              |
                                              Cl
II (171.6)

(C)

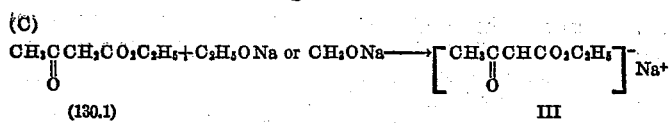

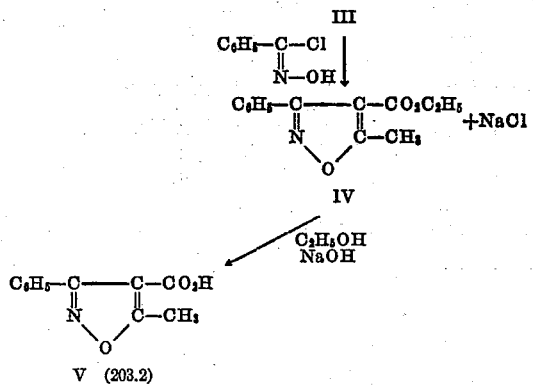

(A) BENZALDOXIME (I) [REFERENCE: VOGEL, "TEXTBOOK OF PRACTICAL ORGANIC CHEMISTRY," PAGE 883]

Materials: (Theoretical yield—121.1 of free oxime) 106.1 g. (1.0 mole) of benzaldehyde (NF grade); 69.5 g. (1.0 mole) of hydroxylamine hydrochloride (practical grade); 68.0 g. (1.7 mole) of sodium hydroxide (pellet).

Procedure: The sodium hydroxide is dissolved in 200 ml. water and the benzaldehyde is added. With continued stirring the hydroxylamine hydrochloride is added in portions. Some heat is developed and eventually the benzaldehyde dissolves. The solution is stirred for fifteen minutes and then cooled in an ice-bath. A waxy, crystalline mass separates, and after further cooling it is collected by suction and dried in air.

Yield—86 to 149 g. This crude material is suitable for step B.

(B) BENZOHYDROXIMIC CHLORIDE (II) [REFERENCE: G. W. PERROLD ET AL., J. AM. CHEM. SOC., 79, 462 (1957)]

Materials: 121 g. (0.77 mole) of crude benzaldoxime from section A, 500 ml. of 8.3 N hydrochloric acid, chlorine.

Procedure: The crude product from A is suspended in the hydrochloric acid, cooled in an ice-salt mixture, and chlorine is passed into the mixture with stirring for one-half to one hour. Transient blue and green colors may be noticed in the mixture during this time. The temperature will probably rise to 3–5° C. The solid is collected by suction filtration and dried for an hour or so on the filter before use in C. If at all possible, it should be used on the day of preparation. Yield—71 g. (after 1½ hours on the filter).

(C) 5-METHYL-3-PHENYL-4-ISOXAZOLECARBOXYLIC ACID (V) [REFERENCE: A. QUILICO AND R. FUSCO, GAZZ. CHIM. ITAL. 67, 589 (1937); C.A. 32, 2117⁷]

Materials: 71 g. (0.45 mole) of crude benzohydroximic chloride from B, 78 g. (0.60 mole) of ethyl acetoacetate (practical grade), 34 g. (0.60 mole) of sodium methoxide (95% minimum), 400 ml. of methanol (reagent grade).

Procedure: The sodium methoxide is cautiously added in portions to 200 ml. of methanol with stirring. Some heat is evolved. To this warm solution is rapidly added the ethyl acetoacetate with continued stirring. The solution is stirred for ten minutes and then cooled in an ice-salt acetone mixture (−25° C.). If desirable a Dry Ice-acetone cooling bath may be used to shorten the addition time. The crude material from B is dissolved in 200 ml. of methanol. At this point it is probably easier to filter this mixture by suction to remove a large amount of insoluble solid, which is probably sodium chloride. The solid may be rinsed with more methanol. The filtrate is chilled in ice-water and added to the cooled methanolic solution of the sodium derivative of ethyl acetoacetate at a rate which keeps the temperature of the reaction mixture below 0° C. The addition time will be fifteen to twenty minutes if ice-salt-acetone is used as a coolant. "This reaction is extremely exothermic."

The reaction mixture is allowed to stir overnight at room temperature and filtered to remove the sodium chloride. The filtrate is stripped in vacuo and the crude ester (literature reports M.P. 48° C.) is dissolved in 150 ml. of ethanol; 28 g. (0.70 mole) of sodium hydroxide in 90 ml. of water is added and the solution is refluxed for two hours. After removal of the ethanol in vacuo the residue is dissolved in water and extracted twice with ether. Dissolved ether is removed from the aqueous solution in vacuo and it is acidified to pH 2 with concentrated hydrochloric acid.

The crystalline crude acid is dried briefly and then recrystallized from acetonitrile to give 32 g. of white product; M.P. 193–194.5° C. (literature reports 189–190° C.). Concentration of the mother liquor gives an additional 5 g. of material having M.P. 192.5–194° C.

The 37 g. of material represents an 18% overall yield from benzaldehyde.

An experiment in which a freshly prepared solution of sodium ethoxide was used gave a yield approximately double that reported above.

An additional illustration of this procedure is given by the following preparation of 3-(p-chlorophenyl)-5-methyl-4-isoxazolecarbonyl chloride:

p-Chlorobenzaldoxime (I).—A mixture of 140.6 g. (1 mole) of p-chlorobenzaldehyde and 500 ml. of water were warmed (to about 50°) on the steam bath until the aldehyde melted. A solution of 40 g. (1 mole) of sodium hydroxide in 40 ml. of water was added. The warm mixture was stirred vigorously while a solution of 69.5 g. (1 mole) of hydroxylamine hydrochloride in 100 ml. of water was introduced rapidly. Crystallization of the oxime occurred. The stirred mixture was heated on the steam bath for one-half hour, cooled, and the solid filtered and washed with water. The air dried oxime weighed 146.8 g. (94.4%), M.P. 104–107°. Beil. 7, 236, II 179, gives M.P. 106–107° for the syn form of I). The product was used in the next step without further purification.

p-Chlorobenzhydroximic chloride (II).—Chlorine (35 g., 0.494 mole) was collected in 340 ml. of chloroform at 0°. The chlorine solution was added in portions to a stirred suspension of 75 g. (0.482 mole) of p-chlorobenzaldoxime in 250 ml. of chloroform at such a rate that the temperature was maintained at 0 to 10° with a salt-ice cooling bath. An initial deep blue color formed which gradually became lighter and assumed a green tint. The color gradually faded to give an amber colored solution. After addition of chlorine was complete the reaction mixture was stirred at 0° for 20 minutes. The ice bath was removed. After ¾ hour (the temperature was 22°) the amber colored mixture was filtered to remove a small amount of solid. The solvent was completely removed at reduced pressure to give a crystalline residue of II, M.P. 70–77°. A ten-g. sample of product twice recrystallized from lower alkanes (Skellysolve B) had M.P. 84–86°.

*Methyl 3 - (p-chlorophenyl)-5-methyl-4-isoxazolecarboxylate (III).*—Ethyl acetoacetate (62.5 g., 0.482 mole) was added to a cooled solution of 26 g. (0.482 mole) of sodium methoxide (Mathieson) in 400 ml. of reagent grade methanol and the mixture stirred at room temperature for 15 minutes.

Crude II of M.P. 70–77° (0.428 m.) was dissolved in 300 ml. of methanol (at first a clear solution was obtained, however, after a few minutes a precipitate formed). The solution (plus solid) of II was added in portions over a period of 20 minutes to the above solution of sodio acetoacetic ester cooled initially to −10°. Temperature was maintained at −10 to 0° with a Dry Ice cooling bath. The reaction was very exothermic. Each added portion of II caused a rapid temperature rise. During the addition of II solid separated from the reaction mixture, making stirring inefficient. Therefore, additional methanol was added in 50-ml. portions as needed. A total of 300 ml. of methanol was used in this manner.

After the exothermic effect had subsided, the cooling bath was removed and the reaction mixture stirred for one hr. during which time the temperature rose to 16°. The mixture was refluxed for one hour, cooled, and the solid removed by filtration. The filtrate was concentrated at reduced pressure to a volume of approximately 300 ml. (some solid separated). The resulting methanolic residue of crude III was hydrolyzed without further purification.

*3-(p-chlorophenyl)-5-methyl-4-isoxazolecarboxylic acid (IV).*—A mixture of the methanolic residue of crude III and a solution of 19.2 g. (0.482 mole) of NaOH in 20 ml. of water was refluxed for one hour. Most of the solvent was stripped at reduced pressure. Water (500 ml.) was added to the residue. The aqueous solution was extracted with one 200-ml. portion of chloroform to remove a small amount of an insoluble oil. Acidification of the chilled aqueous phase to pH 2 with concentrated hydrochloric acid precipitated the crude acid (IV). The product was filtered, washed on the filter with three exchanges of water, and air dried; yield 76.9 g., M.P. 200–205°. The product was recrystallized from 1.2 1. of toluene (the hot solution was filtered); yield 50.9 g. (49.9%), M.P. 212–215°.

An analytical sample was recrystallized again from toluene, M.P. 212.5–215°.

*Analysis.*—Calculated for $C_{11}H_8ClNO_3$: C, 55.59; H, 3.393; N, 5.895. Found: C, 55.83; H, 3.52; N, 5.72.

*3-(p-chlorophenyl)-5-methyl-4-isoxazolecarbonyl chloride (V).*—Compound IV (48 g., 0.202 mole) and 80 ml. of thionyl chloride were warmed on the steam bath for one-half hour. The excess thionyl chloride was stripped at reduced pressure. The residue, which crystallized on cooling, was recrystallized from about 300 ml. of Skellysolve B; yield 45.8 g. (88.7%) of tan colored product having M.P. 69–70°.

All temperatures are given in degree centigrade.

The acid chlorides are conveniently prepared by warming a mixture of the acid and thionyl chloride (35 ml. of thionyl chloride per 0.1 mole of acid) on the steam bath until reaction is complete. In many cases the reaction is complete in one-half hour or less. With less reactive acids one to two hours may be required. Usually no catalyst is used, however, it may, in some instances, be desirable to employ a small amount of either pyridine or dimethylformamide. The products are isolated by distilling the excess thionyl chloride at reduced pressure. The crude acid chloride is purified either by vacuum distillation or by recrystallization from a suitable solvent such as cyclohexane, petroleum ether, benzene, or mixtures of these.

In many instances it is not possible to prepare either the sodium or potassium salt of the penicillin in crystalline form from the methyl isobutyl ketone extract of the crude acid penicillin. Therefore, the penicillin is extracted into aqueous sodium bicarbonate and this solution treated with N,N'-dibenzylethylenediamine diacetate. The penicillin amine salt usually crystallizes at once in the form of a very water insoluble substance. Purification is accomplished by dissolving the penicillin salt in methanol (or in some cases acetone) and reprecipitating with water. Frequently analytically pure material results from one recrystallization. Subsequently the acid penicillin is regenerated and converted into either the sodium or potassium salt, which is usually crystalline and analytically pure. In those instances where the salts failed to crystallize, very pure amorphous products could be obtained.

It is sometimes preferred to prepare the new penicillins from a fermentation liquor containing 6-aminopenicillanic acid or one of its intermediate concentrates. Examples of carboxylic acids which may be employed to prepare the new penicillins are:

5-methyl-3-phenylisoxazole-4-carboxylic acid,
3:5-diphenylisoxazole-4-carboxylic acid,
3:5-dimethylisoxazole-4-carboxylic acid,
3-p-chlorophenyl-5-methylisoxazole-4-carboxylic acid,
5-methyl-3-styrylisoxazole-4-carboxylic acid,
5-t-butyl-3-phenylisoxazole-4-carboxylic acid,
3-methyl-5-methylthioisoxazole-4-carboxylic acid,
3-methyl-5-benzylthioisoxazole-4-carboxylic acid.

The following examples illustrate the invention:

Example 1

5-METHYL-3-PHENYL-4-ISOXAZOLYLPENICILLIN

A solution of 5-methyl-3-phenylisoxazole-4-carbonyl chloride (4.43 g.) in acetone (120 ml.) was added gradually to a stirred solution of 6-aminopenicillanic acid (4.32 g.) in 3% aqueous sodium bicarbonate (168 ml.) and acetone (50 ml.). When addition was complete the mixture was stirred at room temperature for 4 hours and then extracted with ether (2 x 200 ml.), only the aqueous phase being retained. This aqueous solution was covered with ether (50 ml.) and adjusted to pH 2 by the addition of N hydrochloric acid. After separating the layers, the aqueous phase was extracted with two further 50 ml. portions of ether. The combined ether solutions (which at this stage contained the free penicillin acid) were washed with water and then neutralized by shaking with N sodium bicarbonate solution (20 ml.). The aqueous phase was separated, washed with ether, and evaporated at low temperature and pressure to leave the crude sodium salt of 5-methyl-3-phenyl-4-isoxazolylpenicillin as a white solid, which was finally dried in vacuo over phosphorus pentoxide and found to weigh 7.34 g.

The product inhibited Staph. Oxford at a concentration of 0.25 mcg./ml., the benzylpenicillin-resistant Staph. 1 at 1.25 mcg./ml., and the benzyl-penicillin-resistant Staph. 2 at 1.25 mcg./ml.

Example 2

3:5-DIPHENYL-4-ISOXAZOLYLPENICILLIN

A solution of 3:5-diphenylisoxazole-4-carbonyl chloride (750 mg.) in acetone (16 ml.) was added dropwise to a stirred solution of 6-aminopenicillanic acid (575 mg.) in 3% aqueous sodium bicarbonate solution (23 ml.) and acetone (7 ml.). The mixture was stirred for 3 hours at room temperature and then worked up as described in Example 1, to give the sodium salt of 3:5-diphenyl-4-isoxazolylpenicillin as a cream-colored solid (890 mg.).

Staph. 1 and Staph. 2 are typical benzylpenicillin-resistant strains of Staphylococcus which are inhibited by benzylpenicillin only at concentrations of at least 50 mcg./ml.

Example 3
3-METHYL-5-PHENYL-4-ISOXAZOLYLPENICILLIN

A solution of 3-methyl-5-phenylisoxazole-4-carbonyl chloride (9.95 g.) in acetone (140 ml.) was added gradually to a stirred solution of 6-aminopenicillanic acid (9.74 g.) in 6% aqueous sodium bicarbonate (189 ml.) and acetone (50 ml.). When addition was complete the mixture was stirred at room temperature for 4 hours and then extracted with ether (3 x 150 ml.) only the aqueous phase being retained.

This aqueous phase was covered with ether (100 ml.) and adjusted to pH 2 by the addition of N hydrochloric acid. After separating the layers the aqueous phase was extracted with two further 75 ml. portions of ether. The combined ether solutions were washed with water (2 x 75 ml.) and then neutralized by shaking with N sodium bicarbonate solution (45 ml.).

The aqueous phase was separated, washed with ether and evaporated at low temperature and pressure to leave the crude sodium salt of 3-methyl-5-phenyl-4-isoxazolylpenicillin as a pale yellowish solid which was finally dried in vacuo over phosphorus pentoxide. The product (18.4 g.) was estimated by colorimetric assay with hydroxylamine against a benzylpenicillin standard to be about 65% pure.

It inhibited Staph. Oxford at a concentration of 0.1 mcg./ml., the benzylpenicillin-resistant Staph. 1 at 1.25 mcg./ml., and the benzylpenicillin-resistant Staph. 2 at 1.25 mcg./ml.

Example 4
3,5-DIMETHYL-4-ISOXAZOLYLPENICILLIN

A solution of 3,5-dimethylisoxazole-4-carbonyl chloride (3.71 g.) in acetone (136 ml.) was added during 10 minutes to a stirred solution of 6-aminopenicillanic acid (4.98 g.) in 3% aqueous sodium bicarbonate (193 ml.) and acetone (57 ml.). The mixture was stirred for 4 hours and then worked up as described in Example 3 to give the sodium salt of 3,5-dimethyl-4-isoxazolylpenicillin (6.23 g.).

Colorimetric assay with hydroxylamine against a benzylpenicillin standard indicated a purity of 68%.

It inhibited Staph. Oxford at 0.25 mcg./ml.

Example 5
5-BENZYL-3-METHYL-4-ISOXAZOLYLPENICILLIN

The reaction between 6-aminopenicillanic acid (4.33 g.) and 5-benzyl-3-methylisoxazole-4-carbonyl chloride (4.75 g.) under the conditions described in Example 3, gave the sodium salt of 5-benzyl-3-methyl-4-isoxazolylpenicillin (7.85 g.).

Colorimetric assay with hydroxylamine against a benzylpenicillin standard indicated a purity of 68%.

It inhibited Staph. Oxford at 0.5 mcg./ml.

5-benzyl-3-methylisoxazole-4 - carboxylic acid, M.P. 139–140° C., was obtained from the reaction between ethyl α-(phenylacetyl)acetoacetate and hydroxylamine hydrochloride in aqueous ethanol followed by hydrolysis of the ester product. Reaction of the acid with thionyl chloride gave 5-benzyl-3-methylisoxazole-4-carbonyl chloride, B.P. 144–146° C. at 2 mm.

Example 6
3-METHYL-5-STYRYL-4-ISOXAZOLYLPENICILLIN

The reaction between 6-aminopenicillanic acid (7.15 g.) and 3-methyl-5-styrylisoxazole-4-carbonyl chloride (8.35 g., crude product, M.P. 108–109° C. from treatment of the acid with thionyl chloride) under the conditions described in Example 3 gave the sodium salt of 3-methyl-5-styryl-4-isoxazoylpenicillin (13.16 g.).

Colorimetric assay with hydroxylamine against a benzylpenicillin standard indicated a purity of 73%.

It inhibited Staph. Oxford at 0.1 mcg./ml., Staph. 1 a 2.5 mcg./ml., and Staph. 2 at 1.25 mcg./ml.

Example 7
5-TERT-BUTYL-3-PHENYL-4-ISOXAZOLYL PENICILLIN

The reaction between 6-aminopenicillanic acid (3.90 g.) and 5-tert-butyl-3-phenylisoxazole-4-carbonyl chloride (4.95 g.; B.P. 140–141°/1.75 mm., from treatment of the acid with thionyl chloride) under the conditions described in Example 3 gave the sodium salt of 5-tert-butyl-3-phenyl-4-isoxazolylpenicillin (7.45 g.).

Colorimetric assay with hydroxylamine against a benzylpenicillin standard indicated a purity of 44%.

It inhibited Staph. Oxford at 5 mcg./ml., Staph. 1 at 12.5 mcg./ml. and Staph. 2 at 12.5 mcg./ml.

Example 8
5-(2-FURYL)-3-METHYL-4-ISOXAZOLYLPENICILLIN

The reaction between 6-aminopenicillanic acid (10.3 g.) and 5-(2-furyl)-3-methylisoxazole-4-carbonyl chloride (9.6 g.; crude product from treatment of the acid with thionyl chloride), under the conditions described in Example 3 gave the sodium salt of 5-(2-furyl)-3-methyl-4-isoxazolylpenicillin (17.06 g.).

Colorimetric assay with hydroxylamine against a benzylpenicillin standard indicated a purity of 69%.

It inhibited Staph. Oxford at 0.1 mcg./ml., Staph. 1 at 2.5 mcg./ml. and Staph. 2 at 2.5 mcg./ml.

The 5-(2-furyl)-3-methylisoxazole-4 - carboxylic acid, M.P. 222–224° C. from which the acid chloride was prepared, resulted from the reaction between ethyl α-(2-furoyl)-acetoacetate and hydroxylamine hydrochloride in aqueous ethanol, followed by hydrolysis of the ester product.

Example 9
3-METHYL-5-(3',5'-DIMETHYL-4'-ISOXAZOLYL)-4-ISOXAZOLYLPENICILLIN The reaction between 6-aminopenicillanic acid (9.35 g.) and 3-methyl-5-(3',5'-dimethyl-4'-isoxazolyl)-isoxazole-4-carbonyl chloride (10.42 g., B.P. 122–124° at 0.9 mm., from treatment of the acid with thionyl chloride) under the conditions described in Example 3 gave the sodium salt of 3-methyl-5-(3',5'-dimethyl-4-isoxazolyl)-4-isoxazolylpenicillin (18.5 g.) as a pale yellow solid.

Colorimetric assay with hydroxylamine against a benzylpenicillin standard indicated a purity of 60%.

It inhibited Staph. Oxford at 1.25 mcg./ml., Staph. 1 at 2.5 mcg./ml. and Staph. 2 at 5 mcg./ml.

The 3-methyl-5-(3',5'-dimethyl-4'-isoxazolyl)isoxazole-4-carboxylic acid used to prepare the acid chloride was obtained as white needles, M.P. 187–188° C. from the reaction between ethyl α-(3,5-dimethylisoxazole-4-carbonyl)acetoacetate and hydroxylamine hydrochloride in aqueous ethanol and hydrolysis of the ester product.

Example 10
3-METHYL-5-(2-THIENYL)-4-ISOXAZOLYLPENICILLIN

The reaction between 6-aminopenicillanic acid (6.48 g.) and 3-methyl-5-(2-thienyl)isoxazole-4-carbonyl chloride (7.02 g., M.P. 109–110° C., from treatment of the acid with thionyl chloride) under the conditions described in Example 3 gave the sodium salt of 3-methyl-5-(2-thienyl)-4-isoxazolylpenicillin (11.97 g.) as a pale yellow solid.

Colorimetric assay with hydroxylamine against a benzylpenicillin standard indicated a purity of 70%.

It inhibited Staph. Oxford at 0.25 mcg./ml., Staph. 1 at 1.25 mcg./ml., and Staph. 2 at 125 mcg./ml.

The 3-methyl-5-(2-thienyl)isoxazole-4-carboxylic acid, M.P. 200–201° C., from which the acid chloride was obtained, was prepared by hydrolysis of the ester product of the reaction between ethyl α-(2-thenoyl)acetoacetate (from ethyl acetoacetate, sodium, and 2-thenoyl chloride in benzene) and hydroxylamine hydrochloride in aqueous ethanol.

Example 11

3-(p-CHLOROPHENYL)5-METHYL-4-ISOXAZOLYL-PENICILLIN

The reaction between 6-aminopenicillanic acid (6.5 g.) and 3-(p-chlorophenyl)-5-methylisoxazole-4-carbonyl chloride (7.66 g., M.P. 70–71° C., from treatment of the acid with thionyl chloride) under the conditions described in Example 3 gave the sodium salt of 3-(p-chlorophenyl)-5-methyl-4-isoxazolylpenicillin (9.98 g.) as a pale yellow solid.

Colorimetric assay with hydroxylamine against a benzylpenicillin standard indicated a purity of 68%.

It inhibited Staph. Oxford at 0.02 mcg./ml., Staph. 1 at 0.5 mcg./ml., and Staph. 2 at 0.25 mcg./ml.

The 3-(p-chlorophenyl)-5-methylisoxazole-4-carboxylic acid, M.P. 212–213° C., from which the acid chloride was prepared, was obtained by hydrolysis of the ester product of the reaction between p-chlorobenzohydroximic chloride and ethyl acetoacetate in methanolic sodium methoxide.

Example 12

3-METHYL-5-METHYLMERCAPTO-4-ISOXAZOLYL-PENICILLIN

A solution of 3-methyl-5-methylmercaptoisoxazole-4-carbonyl chloride (5.75 g., crude product from treatment of the acid with thionyl chloride) in dry chloroform was added during 10 minutes to a stirred suspension of 6-aminopenicillanic acid (6.5 g.) in dry chloroform (150 ml.) containing triethylamine (12.6 ml.). The mixture was stirred for 2 hours, then it was filtered. The chloroform solution was shaken with N hydrochloric acid to give an aqueous phase of pH 2, only the chloroform phase being retained. The latter was washed with water (2 x 100 ml.), treated with charcoal, and filtered.

The chloroform solution was shaken with sufficient N aqueous sodium bicarbonate solution to give a neutral aqueous phase (pH 7). The layers were separated, and the chloroform solution was extracted with water. The combined aqueous extracts were evaporated at low temperature and pressure to leave a brown solid residue of the crude sodium salt of 3-methyl-5-methylmercapto-4-isoxazolylpenicillin (3.32 g.).

Colorimetric assay with hydroxylamine against a benzyl-penicillin standard indicated a purity of 31%.

It inhibited Staph. Oxford at 0.2 mcg./ml.

Example 13

5-(p-CHLOROPHENYL)-3-METHYL-4-ISOXAZOLYL-PENICILLIN

A solution of 5-(p-chlorophenyl)-3-methylisoxazole-4-carbonyl chloride (13.5 g.) in dry acetone (320 ml.) was added during 10 minutes to a stirred solution of 6-aminopenicillanic acid (11.5 g.) in 3% aqueous sodium bicarbonate (440 ml.) and acetone (130 ml.). The mixture was stirred for 2 hours and then extracted with ether (2 x 200 ml.), only the aqueous phase being retained. The latter was covered with ether (100 ml.) and adjusted to pH 2 by the addition of N hydrochloric acid. After separating the layers, the aqueous phase was extracted with two further 100 ml. portions of ether. The combined ether solutions, containing the free penicillin acid, were washed with water (2 x 50 ml.) and then shaken with sufficient N aqueous sodium bicarbonate solution to give a neutral aqueous phase (pH 7). The aqueous phase was separated, washed with ether and evaporated at low temperature and pressure to leave a solid residue of the crude sodium salt of 5-(p-chlorophenyl)-3-methyl-4-isoxazolyl-penicillin (21.4 g.).

Colorimetric assay with hydroxylamine against a benzylpenicillin standard indicated it to be about 69% pure.

The product inhibited Staph. Oxford at a concentration of 0.02 mcg./ml., Staph. 1 at 0.5 mcg./ml., and Staph. 2 at 0.25 mcg./ml.

Example 14

3-METHYL-5-(o-NITROPHENYL)-4-ISOXAZOLYL-PENICILLIN

A solution of 3-methyl-5-(o-nitrophenyl)isoxazole-4-carbonyl chloride (13.6 g.) in dry acetone (300 ml.) was added during 10 minutes to a stirred solution of 6-aminopenicillanic acid (10.8 g.) in 3% aqeuous sodium bicarbonate (420 ml.) and acetone (125 ml.). The mixture was stirred for three hours and then extracted with ether (3 x 200 ml.), only the aqueous phase being retained. The latter was covered with ether (100 ml.) and adjusted to pH 2 by the addition of N hydrochloric acid. After separating the layers, the aqueous phase was extracted with two further 75 ml. portions of ether. The combined ether solutions were washed with water (2 x 50 ml.) and then shaken with sufficient N aqueous sodium bicarbonate solution to give a neutral aqueous phase (pH 7). The layers were separated, and the ether solution was extracted with water (25 ml.). The combined aqueous extracts were washed with ether and evaporated at low temperature and pressure to leave a yellow solid residue of the crude sodium salt of 3-methyl-5-(o-nitrophenyl)-4-isoxazolylpenicillin (23 g.).

Colorimetric assay with hydroxylamine against a benzylpenicillin standard indicated it to be about 67% pure.

The product inhibited Staph. Oxford at a concentration of 0.1 mcg./ml., Staph. 1 at 1.25 mcg./ml., and Staph. 2 at 0.5 mcg./ml.

Example 15

The following penicillins are prepared by reaction of the named acids with 6-aminopenicillanic acid by way of the acid chloride or other suitable intermediate in accordance with the above procedures:

| Acid | Penicillin |
| --- | --- |
| 3-o-Chlorophenyl-5-methylisoxazole-4-carboxylic acid | 3-o-Chlorophenyl-5-methyl-4-isoxazolylpenicillin. |
| 3-m-Chlorophenyl-5-methylisoxazole-4-carboxylic acid | 3-m-Chlorophenyl-5-methyl-4-isoxazolylpenicillin. |
| 3-(2,4-Dichlorophenyl)-5-methylisoxazole-4-carboxylic acid | 3-(2,4-Dichlorophenyl)-5-methyl-4-isoxazolylpenicillin. |
| 3-(3,4-Dichlorophenyl)-5-methylisoxazole-4-carboxylic acid | 3-(3,4-Dichlorophenyl)-5-methyl-4-isoxazolylpenicillin. |
| 3-p-Tolyl-5-methylisoxazole-4-carboxylic acid | 3-p-Tolyl-5-methyl-4-isoxazolylpenicillin. |
| 3-o-Nitrophenyl-5-methylisoxazole-4-carboxylic acid | 3-o-Nitrophenyl-5-methyl-4-isoxazolylpenicillin. |
| 3-m-Nitrophenyl-5-methylisoxazole-4-carboxylic acid | 3-m-Nitrophenyl-5-methyl-4-isoxazolylpenicillin. |
| 3-p-Nitrophenyl-5-methylisoxazole-4-carboxylic acid | 3-p-Nitrophenyl-5-methyl-4-isoxazolylpenicillin. |
| 3-p-Bromophenyl-5-methylisoxazole-4-carboxylic acid | 3-p-Bromophenyl-5-methyl-4-isoxazolylpenicillin. |
| 3-p-Fluorophenyl-5-methylisoxazole-4-carboxylic acid | 3-p-Fluorophenyl-5-methyl-4-isoxazolylpenicillin. |
| 3-p-Methylsulphonylphenyl-5-methylisoxazole-4-carboxylic acid | 3-p-Methylsulphonylphenyl-5-methyl-4-isoxazolylpenicillin. |
| 3-p-Methoxyphenyl-5-methylisoxazole-4-carboxylic acid | 3-p-Methoxyphenyl-5-methyl-4-isoxazolylpenicillin. |
| 3-p-Trifluoromethylphenyl-5-methyl-isoxazole-4-carboxylic acid | 3-p-Trifluoromethylphenyl-5-methyl-4-isoxazolylpenicillin. |
| 3-o-Methoxyphenyl-5-methylisoxazole-4-carboxylic acid | 3-o-Methoxyphenyl-5-methyl-4-isoxazolylpenicillin. |
| 3-p-Ethoxyphenyl-5-methylisoxazole-4-carboxylic acid | 3-p-Ethoxyphenyl-5-methyl-4-isoxazolylpenicillin. |
| 3-(3,4-Dimethoxyphenyl)-5-methylisoxazole-4-carboxylic acid | 3-(3,4-Dimethoxyphenyl)-5-methyl-4-isoxazolylpenicillin. |
| 3-p-Dimethylaminophenyl-5-methylisoxazole-4-carboxylic acid | 3-p-Dimethylaminophenyl-5-methyl-4-isoxazolylpenicillin. |
| 3-α-Naphthyl-5-methylisoxazole-4-carboxylic acid | 3-α-Naphthyl-5-methyl-4-isoxazolylpenicillin. |
| 3-β-Naphthyl-5-methylisoxazole-4-carboxylic acid | 3-β-Naphthyl-5-methyl-4-isoxazolylpenicillin. |
| 3-Phenyl-5-ethylisoxazole-4-carboxylic acid | 3-Phenyl-5-ethyl-4-isoxazolylpenicillin. |
| 3-p-Chlorophenyl-5-ethylisoxazole-4-carboxylic acid | 3-p-Chlorophenyl-5-ethyl-4-isoxazolylpenicillin. |
| 3-Phenyl-5-isopropyl-isoxazole-4-carboxylic acid | 3-Phenyl-5-isopropyl-4-isoxazolylpenicillin. |
| 3-Phenyl-5-methylmercaptoisoxazole-4-carboxylic acid | 3-Phenyl-5-methylmercapto-4-isoxazolylpenicillin. |
| 3-Methyl-5-o-chlorophenylisoxazole-4-carboxylic acid | 3-Methyl-5-o-chlorophenyl-4-isoxazolylpenicillin. |
| 3-Methyl-5-p-bromophenylisoxazole-4-carboxylic acid | 3-Methyl-5-p-bromophenyl-4-isoxazolylpenicillin. |

| Acid | Penicillin |
|---|---|
| 3-Methyl-5-o-iodophenylisoxazole-4-carboxylic acid | 3-Methyl-5-o-iodophenyl-4-isoxazolylpenicillin. |
| 3-Methyl-5-(2,4-dichlorophenyl)-isoxazole-4-carboxylic acid | 3-Methyl-5-(2,4-dichlorophenyl)-4-isoxazolylpenicillin. |
| 3-Methyl-5-m-nitrophenylisoxazole-4-carboxylic acid | 3-Methyl-5-m-nitrophenyl-4-isoxazolylpenicillin. |
| 3-Methyl-5-p-tolylisoxazole-4-carboxylic acid | 3-Methyl-5-p-tolyl-4-isoxazolylpenicillin. |
| 3-Methyl-5-p-nitrophenyl-isoxazole-4-carboxylic acid | 3-Methyl-5-p-nitrophenyl-4-isoxazolylpenicillin. |
| 3-Methyl-5-p-methoxyphenyl-isoxazole-4-carboxylic acid | 3-Methyl-5-p-methoxyphenyl-4-isoxazolylpenicillin. |
| 3-Methyl-5-p-ethoxyphenyl-isoxazole-4-carboxylic acid | 3-Methyl-5-p-ethoxyphenyl-4-isoxazolylpenicillin. |
| 3-Methyl-5-(2,6-dimethoxyphenyl)isoxazole-4-carboxylic acid | 3-Methyl-5-(2,6-dimethoxyphenyl)-4-isoxazolylpenicillin. |
| 3-Methyl-5-p-methylsulphonyl-phenylisoxazole-4-carboxylic acid | 3-Methyl-5-p-methylsulphonylphenyl-4-isoxazolylpenicillin. |
| 3-Methyl-5-p-fluorophenyl-isoxazole-4-carboxylic acid | 3-Methyl-5-p-fluorophenyl-4-isoxazolylpenicillin. |
| 3-Methyl-5-p-cyanophenyl-isoxazole-4-carboxylic acid | 3-Methyl-5-p-cyanophenyl-4-isoxazolylpenicillin. |
| 3-Methyl-5-p-methylmercaptophenylisoxazole-4-carboxylic acid | 3-Methyl-5-p-methylmercaptophenyl-4-isoxazolylpencillin. |
| 3-Methyl-5-p-dimethylaminophenylisoxazole-4-carboxylic acid | 3-Methyl-5-p-dimethylaminophenyl-4-isoxazolylpenicillin. |
| 3-Methyl-5-α-naphthylisoxazole-4-carboxylic acid | 3-Methyl-5-α-naphthyl-4-isoxazolylpenicillin. |
| 3-Methyl-5-β-naphthylisoxazole-4-carboxylic acid | 3-Methyl-5-β-naphthyl-4-isoxazolylpenicillin. |
| 3-Ethyl-5-phenylisoxazole-4-carboxylic acid | 3-Ethyl-5-phenyl-4-isoxazolylpenicillin. |
| 3-Ethyl-5-p-chlorophenylisoxazole-4-carboxylic acid | 3-Ethyl-5-p-chlorophenyl-4-isoxazolylpenicillin. |
| 3-Isopropyl-5-phenylisoxazole-4-carboxylic acid | 3-Isopropyl-5-phenyl-4-isoxazolylpenicillin. |
| 3-tert. Butyl-5-methylisoxazole-4-carboxylic acid | 3-tert. Butyl-5-methyl-4-isoxazolylpenicillin. |
| 3-Methyl-5-p-trifluoromethylphenyl-isoxazole-4-carboxylic acid | 3-Methyl-5-p-trifluoromethylphenyl-4-isoxazolylpenicillin. |
| 3-Methyl-5-cyclohexylisoxazole-4-carboxylic acid | 3-Methyl-5-cyclohexyl-4-isoxazolylpenicillin. |
| 3-Cyclohexyl-5-methylisoxazole-4-carboxylic acid | 3-Cyclohexyl-5-methyl-4-isoxazolylpenicillin. |
| 3-α-Furyl-5-methylisoxazole-4-carboxylic acid | 3-α-Furyl-5-methyl-4-isoxazolylpenicillin. |
| 3-α-Thienyl-5-methylisoxazole-4-carboxylic acid | 3-α-Thienyl-5-methyl-4-isoxazolylpenicillin. |

Many of the new penicillins of the present invention possess the useful property of being relatively stable to acids, and thus are suitable for oral administration. As a measure of such stability, the "half-lives" of several of the new penicillins dissolved in 50% aqueous ethanol at pH 1.3 and 35° C. were determined and compared with corresponding figures for penicillin G and penicillin V. The stability to acid of the penicillins tabulated below can readily be seen to compare favorably with that of penicillin V and to be vastly greater than that of penicillin G.

| Penicillin | Half-life at pH 1.3 and 35° C. |
|---|---|
| | Mins. |
| 5-Methyl-3-phenyl-4-isoxazolyl | 160 |
| 3-Methyl-5-phenyl-4-isoxazolyl | 160 |
| 3-p-Chlorophenyl-5-methyl-4-isoxazolyl | 150 |
| Penicillin V | 160 |
| Penicillin G | 3½ |

*Example 16*

3,5-DIMETHYL-4-ISOXAZOLYLPENICILLIN

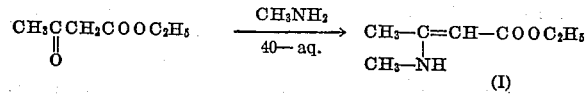

(I)

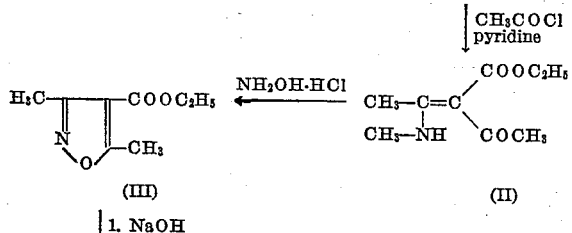

(III)          (II)

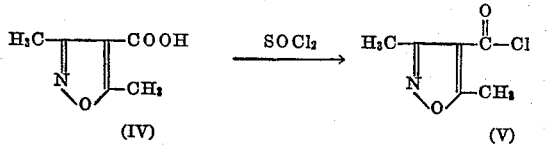

(IV)          (V)

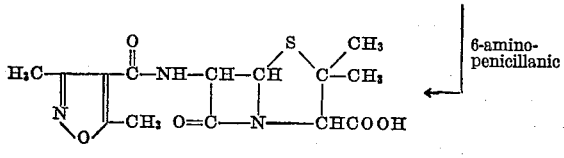

(VI)

Aqueous methylamine (3.0 m., 264 ml. of 40% solution) was added slowly with cooling to ethyl acetoacetate (3.0 m., 395 g.), heated twenty minutes on the steam bath and chilled. The crude I was extracted into 900 ml. toluene, dried over NA₂SO₄ which was removed by filtration and from the solution about 100 ml. solvent was removed by distillation in vacuo to remove all water. To this solution in toluene of I there was added 240 ml. pyridine and then acetyl chloride (3.0 m., 213 ml.) was added dropwise over a period of 2.25 hours at −2 to 3° C. After extracting the reaction mixture three times with 500 ml. portions of water, the toluene phase was dried over Na₂SO₄, filtered and distilled to remove the solvent and leave a residue of crude II which was mixed with 600 ml. methanol and hydroxylamine hydrochloride (209 g.). On heating the mixture to reflux there occurred at first a mildly exothermic reaction which was controlled by cooling in an ice bath. The solution was then refluxed for thirty minutes and the solvent was removed by distillation at reduced pressure to leave a residue to which 500 ml. water was added. The crude product (III) precipitated as an oil and was separated and combined with 100 ml. toluene used to extract the aqueous supernatant phase. After removal of the toluene by distillation in vacuo, the residue of crude ester (III) was combined with a solution of sodium hydroxide (3.0 m., 120 g.) in one liter of water and refluxed for 45 minutes. The mixture was cooled, acidified with concentrated hydrochloric acid (300 ml.) and chilled thoroughly to precipitate crystalline acid (IV) which was collected, washed with water, dried in an oven at 65° C. and found to weigh 97 g.

The acid IV (50 g.) and 140 ml. SOCl₂ were warmed on the steam bath 30 minutes; after removal of the excess SOCl₂ by distillation at reduced pressure, the residue was distilled to give 50 g. acid chloride V, B.P. 50° C./2 mm.

Acid chloride V (0.0627 m., 10 g.) in 30 ml. acetone was added slowly to a mixture of 6-aminopenicillanic acid, NaHCO₃ (0.188 m., 15.8 g.), 100 ml. water and 70 ml. acetone at 0°–5° C. After stirring for 15 minutes at 0° C., the mixture was extracted with three portions of methyl isobutyl ketone and the latter was discarded. The aqueous phase was covered with methyl isobutyl ketone and acidified with 42% H₃PO₄. After separating the solvent and again extracting, the combined solvent phase was dried over Na₂SO₄. After filtering, there was added 30 ml. of a 40% solution of potassium 2-ethylhexanoate in n-butanol (0.0627 m.). Removal of 50 ml. butanol by flash evaporation gave only a clear solution and the butanol was therefore twice extracted with 100 ml. portions of water. To the aqueous extracts there was added a solution of 11.3 g. (0.6313 m.) N,N'-dibenzylethylenediamine diacetate in 80 ml. water; the crystalline amine bis-penicillin salt separated at once was collected by filtration, washed with water, air dried and found to weigh 14.8 g.

A second experiment using triple quantities gave 60.8 g. of this amine salt of 3,5-dimethyl-4-isoxazolylpenicillin which was then suspended in 250 ml. water, covered with 500 ml. methyl isobutyl ketone and acidified with 42% $H_3PO_4$. After shaking the mixture until the solid disappeared, the solvent phase was separated and the aqueous phase was reextracted with 100 ml. methyol isobutyl ketone. The combined solvent extracts were dried with $Na_2SO_4$ and filtered. The addition of 65.4 ml. (0.169 mole) sodium 2-ethylhexanoate in n-butanol gave no separation of product so the solvent was removed on the flash evaporator. Addition to the residual oil of 600 ml. t.-butanol precipitated the sodium salt of 3,5-dimethyl-4-isoxazolylpenicillin (VI) as an amorphous solid which was collected by filtration, washed with t-butanol and diethyl ether and freed of solvent in a desiccator under high vacuum. This sodium salt of the product VI was then dried in vacuo over $P_2O_5$ overnight and found to weigh 17.2 g. Upon heating this salt shrank slightly at 110–130° C., swelled and bubbled at 140–150° C. and turned black at 175–180° C.

This product was found to contain the β-lactam structure as shown by infrared analysis, to inhibit Staph. aureus Smith at a concentration of 0.2 mcg./ml. and to exhibit versus the same organism upon intramuscular injection in mice a $CD_{50}$ of <0.8 to 1.6 mm./kg.

*Example 17*

3-METHYL-5-PHENYL-4-ISOXAZOLYLPENICILLIN

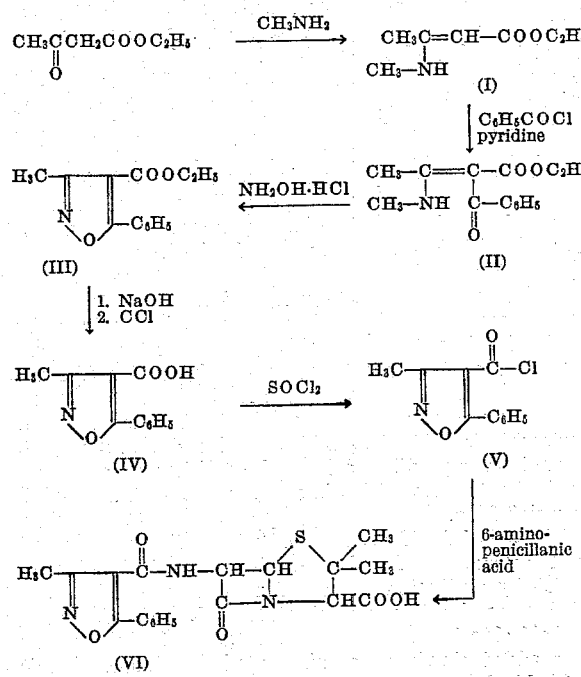

To ethyl acetoacetate (1.0 mole, 130 g.) cooled in ice there was added in several portions a 40% aqueous solution of methylamine (1.0 mole, 80 ml.) to give an exothermic reaction. The mixture was heated 30 minutes on the steam-bath. Toluene (300 ml.) was added to the hot mixture and the small lower layer was separated and discarded. The toluene phase was washed twice with water and then with saturated aqueous sodium chloride, dried 30 minutes over $Na_2SO_4$ in an ice-bath, filtered and combined with some toluene used to wash the $Na_2SO_4$. To the toluene solution of I cooled to −10° C. there was added 80 ml. (1.0 mole) pyridine and then benzoyl chloride (1.0 mole, 141 g.) was added dropwise with stirring over 90 minutes. After stirring 15 minutes longer at −10° C., the toluene containing the product II was washed three times with water and once with saturated aqueous sodium chloride and filtered through $Na_2SO_4$. After removal of the solvent by distillation in vacuo the residual oil II was dissolved in 300 ml. methanol to which there was then added 69.5 g. (1.0 mole) hydroxylamine hydrochloride washed in with 50 ml. methanol. After refluxing the mixture for two hours, the solvent was removed by distillation in vacuo. Toluene (300 ml.) was added and then 200 ml. water to dissolve the solid (methylamine hydrochloride). The toluene phase containing the product III was washed twice with water and then with saturated aqueous sodium chloride and dried overnight over $Na_2SO_4$. Following removal of the drying agent by filtration, the solvent was removed by distillation in vacuo to leave III as the residual oil which was then dissolved in 350 ml. methanol. Addition of a solution of 40 g. (1.0 mole) sodium hydroxide in 40 ml. caused immediate separation of a solid (apparently as the sodium salt of benzoic acid) which was collected by filtration, reserving the filtrate, washed with a little cold methanol and air-dried for an hour. Solution of this solid in water followed by acidification to pH 2 with concentrated hydrochloric acid precipitated 41 g. solid benzoic acid, M.P. 118–126° C. after drying in vacuo over $P_2O_5$.

Evaporation to dryness of the reserved filtrate gave solid product IV as its sodium salt which was dissolved in a moderate amount of water; acidification to pH 2 with concentrated hydrochloric acid precipitated solid IV which was washed with water, dried in vacuo over $P_2O_5$ and found to weigh 42.4 g. M.P. 147–163° C. After recrystallization from cyclohexane-ethanol there was recovered 24 g., M.P. 184–190° C.; subsequent recrystallization from acetonitrile gave 22 g., M.P. 192.5–194.5° C. Beilstein 27, 324; I, 399; II, 383, gives M.P. 188–189° C.

A repeat run using four times the quantities given above yielded 127 g. IV after recrystallization from about 2 l. acetonitrile, M.P. 193–195° C., amide, M.P. 206–207.5° C. (lit. 205° C.) and anilide, M.P. 166–167° C. (lit. 160° C.).

The acid IV was suspended in 210 ml. $SOCl_2$, heated for 2.5 hours on the steam-bath and the mixture was then distilled in vacuo from the steam-bath to remove excess $SOCl_2$. Vacuum distillation then gave 126.6 g. of acid chloride V, B.P. 116–118° C./0.75 mm.

To a solution of 6-aminopenicillanic acid (0.575 mole, 124.7 g.) in a mixture of $NaHCO_3$ (1.73 mole, 146 g.), 900 ml. water, 200 ml. acetone and 50 ml. ether, cooled to −3° C., there was added over 10 minutes a solution of the acid chloride V (0.575 mole, 126.6 g.) in 600 ml. acetone. The temperature rose to 5–70° C. and the mixture was stirred 30 minutes at 5° C. and then extracted three times with methyl isobutyl ketone which was discarded. After covering with methyl isobutyl ketone the aqueous phase containing the sodium salt of the product VI was acidified to pH 2 with $H_3PO_4$. After separating the solvent, the aqueous phase was again extracted with methyl isobutyl ketone. The combined solvent phases containing the product VI in its acid form were extracted with a solution of 49 g. (0.575 mole) of $NaHCO_3$ in 500 ml. water and then again three times with water. These combined aqueous extracts were added to a solution of 105 g. (0.29 mole) N,N'-dibenzylethylenediamine diacetate in 750 ml. water to precipitate the amine salt of VI which was collected, water-washed, air-dried (245 g.) and recrystallized by dissolving in 2.2 l. acetone, filtering and diluting with 3 l. water to give 176 g. N,N'-dibenzylethylenediamine bis-3-methyl-5-phenyl-4-isoxazolylpenicillin (VII).

*Analysis.*—Calcd. for $C_{54}H_{58}N_8O_{10}S_2$: C, 62.1; H, 5.60; N, 10.7. Found: C, 61.97; H, 5.68; N, 9.80.

The penicillin amine salt VII (202 g.) was suspended in water and covered with methyl isobutyl ketone; after acidification to pH 2 with $H_3PO_4$ the mixture was shaken in a separatory funnel until almost all solid disappeared. After separation and three re-extractions of the aqueous phase with methyl isobutyl ketone, the combined solvent phases containing the free avid VI were washed with chilled water and then saturated aqueous sodium chloride and dried over $Na_2SO_4$. After addition of 162 ml. (0.348 mole) of potassium 2-ethylhexanoate in n-butanol, removal of solvent by distillation in vacuo at 35° C. and dilution with n-pentane, the solid potassium salt of VI precipitated and was collected by filtration, washed with dry ether, dried in vacuo and found to weigh 163 g. After slurrying 30 minutes in 2 l. anhydrous ether containing 15 ml. acetone, this product was dried in vacuo over $P_2O_5$ and found to weigh 141 g. and to be very active against benzylpenicillin-resistant Staphylococci both in vivo and in vitro.

*Example 18*

5-ISOPROPYL-3-METHYL-4-ISOXAZOLYLPENICILLIN

*5-isopropyl-3-methyl-4-isoxazolecorboxylic acid* (I).— The acid was prepared by the general procedure described above from ethyl β-methylaminocrotonate and iso-butyl chloride. The crude acid melting at 151–152° was used without further purification.

*5-isopropyl-3-methyl-4-isoxazolecarbonyl chloride* (II). —The acid I (33.8 g., 0.2 moles), and 70 ml. of thionyl chloride were warmed on the steam-bath for one hour. Excess thionyl chloride was distilled at reduced pressure. Vacuum distillation of the residue afforded the pure acid chloride; yield 34.9 g. (93%), B.P. 57° (1 mm.).

*N-acylation of 6-aminopenicillanic acid.*—The acid chloride II (34.9 g., 0.186 mole), in 50 ml. of reagent grade acetone was added rapidly to a stirred mixture of 40.2 g. (0.186 mole) of 6-aminopenicillanic acid, 46.8 g. (0.558 mole) of sodium bicarbonate, 280 ml. of water, and 230 MIBK extracts being discarded. The aqueous phase was stirred for one-half hour in an ice bath. Two extractions with methyl isobutyl ketone (MIBK) were made, the MIBK extracts being discarded. The aqueous phase was layered with 500 ml. of MIBK and acidified with 42% phosphoric acid. Two additional extractions with 150-ml. portions of MIBK were made. The combined MIBK extracts were dried with anhydrous sodium sulfate and filtered.

*Isolation of the N,N'-dibenzylethylenediamine salt.*— The MIBK solution of the acid penicillin was extracted with a solution of 15.6 g. (0.186 mole) of sodium bicarbonate in 170 ml. of water. A second extraction using 170 ml. of water was made. The combined aqueous extracts were treated with a solution of 33.5 g. (0.093 mole) of N,N'-dibenzylethylenediamine diacetate in 240 ml. of water. The crystalline salt separated at once. The product was filtered, washed with water, and air dried; yield 72.8 g. The crude product was dissolved in 1 l. of methanol (room temperature), the solution filtered, cooled, and 500 ml. of water added to reprecipitate the product. The air dried product weighed 52.4 g., M.P. 124–126° (decomposition) with softening above 111°. An analytical sample was dried in high vacuum over phosphorus pentoxide at room temperature.

*Analysis.*—Calcd. for $C_{48}H_{62}N_8O_{10}S_2 \cdot H_2O$: C, 56.72; H, 6.496; $H_2O$, 1.814. Found: C, 56.56; H, 6.90; volatile, 2.08.

*Preparation of the sodium salt.*—The above amine salt (47.4 g., 0.0487 mole) was suspended in 250 ml. of water, layered with 500 ml. of MIBK, and made strongly acid with 42% phosphoric acid. The mixture was shaken until the solid nearly completely disappeared. The MIBK phase was separated. A second extraction with 100 ml. of MIBK was made. The combined extracts were dried with anhydrous sodium sulfate, filtered, and treated with 38 ml. (0.0974 mole) of a solution of sodium 2-ethylhexanoate in 1-butanol to give a clear solution. About 100 ml. of solvent was then removed on the flash evaporator (max. temperature of 40°) in order to completely remove all water. After about 1.5 hours at room temperature crystallization of the sodium salt occurred. The sodium salt was filtered, washed with 3 exchanges of MIBK, dried in high vacuum until all residual solvent had been removed. The product was additionally dried in vacuum over phosphorus pentoxide overnight; yield 23.1 g., M.P. 200–201° (decomposition) with slow darkening above 185°.

*Analysis.*—Calcd. for $C_{16}H_{20}N_3O_5SNa$: C, 49.35; H, 5.177. Found: C, 49.30; H, 5.16; volatile, 0.3.

All temperatures above are given in degrees centigrade.

This product was found to contain the β-lactam structure as shown by infrared analysis, to inhibit *Staph. aureus* Smith at a concentration of 0.02–0.05 mcg./ml. and to exhibit versus the same organism upon intramuscular injection in mice a $CD_{50}$ of 0.24–0.9 mgm./kg.

*Example 19*

Following the procedure of Examples 16, 17 and 18 above, the penicillins listed below were prepared and they and their intermediates were found to have the specified properties (1) 5-n-butyl-3-methyl-4-isoxazolylpenicillin:

(*a*) 5-n-butyl-3-methyl-4-isoxazolecarboxylic acid, M.P. 84–88° C.

(*b*) 5-n-butyl-3-methyl-4-isoxazolecarbonyl chloride, B.P. 70° C./1–1.5 mm.

(*c*) N,N'-dibenzylethylenediamine bis-5-n-butyl-3-methyl-4-isoxazolylpenicillin, M.P. 103–105° C. with decomposition.

*Analysis.*—Calcd. for $C_{50}H_{66}N_8O_{10}S_2$: C, 59.86; H, 6.63; N, 11.2. Found: C, 60.71, 60.75; H, 6.63, 6.64; N, 11.65.

(*d*) Sodium 5-n-butyl-3-methyl-4-isoxazolylpenicillin, M.P. 190–192° C. with decomposition.

*Analysis.*—Calcd. for $C_{17}H_{22}N_3O_5SNa$: C, 50.61; H, 5.50. Found: C, 50.62; H, 5.84.

This product was found to contain the β-lactam structure as shown by infrared analysis, to inhibit *Staph. aureus* Smith at a concentration of 0.05 mcg./ml. and to exhibit versus the same organism upon intramuscular injection in mice a $CD_{50}$ of 0.9 mgm./kg.

(2) 5-isobutyl-3-methyl-4-isoxazolylpenicillin:

(*a*) 5-isobutyl - 3 - methyl-4-isoxazolecarboxylic acid, M.P. 106–110° C.

(*b*) 5-isobutyl-3-methyl-4-isoxazolecarbonyl chloride, B.P. 64° C./1 mm.

(*c*) N,N' - dibenzylethylenediamine bis-5-isobutyl-3-methyl-4-isoxazolylpenicillin, M.P. 119–121° C. with decomposition.

*Analysis.*—Calcd. for $C_{50}H_{66}N_8O_{10}S_2$: C, 59.86; H, 6.63. Found: C, 60.06, 60.43; H, 7.03, 6.60.

(*d*) Sodium 5-isobutyl-3-methyl-4-isoxazolylpenicillin, sample darkened above 160° C. and decomposed at 169–173° C. (when M.P. block was preheated to 150° C.)

*Analysis.*—Calcd. for $C_{17}H_{22}N_3O_5SNa$: C, 50.61; H, 5.50; N, 10.42. Found: C, 51.97, 51.43; H, 5.83, 5.79; N, 10.32, 10.10.

This product was found to contain the β-lactam structure as shown by infrared analysis, to inhibit *Staph. aureus* Smith at a concentration of 0.02–0.1 mcg./ml. and to exhibit versus the same organism upon intramuscular injection in mice a $CD_{50}$ of 1.8–3.8 mgm./kg.

(3) 5-(2-furyl)-3-methyl-4-isoxazolylpenicillin:

(*a*) 5-(2-furyl)-3-methyl-4-isoxazolecarboxylic acid, M.P. 220–224° C.

(*b*) 5-(2-furyl)-3-methyl-4-isoxazolecarbonyl chloride, M.P. 98–100° C. from cyclohexane.

(*c*) N,N' - dibenzylethylenediamine bis-5-(2-furyl)-3-methyl-4-isoxazolylpenicillin, M.P. data: above 123° C. shrinks, 127–129° C. swells, 143–148° C. swells, bubbles.

*Analysis.*—Calcd. for $C_{50}H_{54}N_8O_{12}S_2 \cdot H_2O$: C, 57.68; H, 5.421. Found: C, 57.53; H, 5.57.

(*d*) Sodium 5-(2-furyl)-3-methyl-4-isoxazolylpenicillin, on heating darkened above 158° C. and slowly decomposed; appeared completely decomposed at 200° C.

*Analysis.*—Calcd. for $C_{17}H_{16}N_3O_6SNa$: C, 49.39; H, 3.90. Found: C, 49.74; H, 4.49.

This product was found to contain the β-lactam structure as shown by infrared analysis, to inhibit *Staph. aureus* Smith at a concentration of 0.1–0.2 mcg./ml. and to exhibit versus the same organism upon intramuscular injection in mice a $CD_{50}$ of 23 mgm./kg.

(4) 5 - (3,5-dimethoxyphenyl)-3-methyl-4-isoxazolylpenicillin:

(a) N,N' - dibenzylethylenediamine bis-5-(3,5-dimethoxyphenyl)-3-methyl-4-isoxazolylpenicillin, recrystallized from 50% aqueous methanol, on heating melted slowly and decomposed at 88–130° C.

*Analysis.*—Calcd. for $C_{58}H_{66}N_8O_{14}S_2$: C, 59.88; H, 4.28. Found: C, 60.20; H, 6.05.

(b) Sodium 5 - (3,5-dimethoxyphenyl)-3-methyl-4-isoxazolylpenicillin, on heating gradually darkened, slowly decomposed and became black over the range 145–175° C.

*Analysis.*—Calcd. for $C_{21}H_{22}N_3O_7SNa \cdot H_2O$: C, 50.29; H, 4.2. Found: C, 50.56; H, 5.19.

This product was found to contain the β-lactam structure as shown by infrared analysis, to inhibit *Staph. aureus* Smith at a concentration of 0.4 mcg./ml. and to exhibit versus the same organism upon intramuscular injection in mice a $CD_{50}$ of 22 mgm./kg.

(5) 5-benzyl-3-methyl-4-isoxazolylpenicillin:

(a) 5-benzyl-3-methyl-4-isoxazolecarboxylic acid, M.P. 141–143° C. from toluene and aqueous isopropanol.

*Analysis.*—Calcd. for $C_{12}H_{11}NO_3$: C, 66.35; H, 5.105. Found: C, 66.27; H, 5.20

(b) 5 - benzyl - 3-methyl-4-isoxazolecarbonyl chloride, B.P. 128–130° C./1.5 mm.

(c) N,N'-dibenzylethylenediamine bis-5-benzyl-3-methyl-4-isoxazolylpenicillin, M.P. data: 118° C. shrinks, softens; 121–123° C. swells, bubbles.

*Analysis.*—Calcd. for $C_{56}H_{62}N_8O_{10}S_2 \cdot H_2O$: C, 61.74; H, 5.92; N, 10.29; $H_2O$, 1.65. Found: C, 62.06; H, 6.03; N, 10.25; 1.6% loss in vacuo at 80° C. for 20 minutes.

This product was found to contain the β-lactam structure as shown by infrared analysis, to inhibit *Staph. aureus* Smith at a concentration of 0.2 mcg./ml. and to exhibit versus the same organism upon intramuscular injection in mice a $CD_{50}$ of 1.8–3.9 mgm./kg.

(6) 3 - methyl-5-(p-nitrophenyl)-4-isoxazolylpenicillin (a) 3 - methyl-5-(p-nitrophenyl)-4-isoxazolecarboxylic acid, M.P. 225–226° C. from methyl isobutyl ketone and then toluene.

*Analysis.*—Calcd. for $C_{11}H_8N_2O_5$: C, 53.23; H, 3.25, N, 11.3. Found: C, 53.85; H, 3.37; N, 11.6.

Amide, M.P. 227–230° C. from 95% ethanol.

*Analysis.*—Calcd. for $C_{11}H_9N_3O_4$: C, 53.44; H, 3.67; N, 17.0. Found: C, 53.86; H, 4.11; N, 17.1.

(b) 3 - methyl - 5-(p-nitrophenyl)-4-isoxazolecarbonyl chloride, M.P. 90–92° C.

(c) N,N' - dibenzylethylenediamine bis-3-methyl-5-(p-nitrophenyl)-4-isoxazolylpenicillin, M.P. 147–154° C. with decomposition, becoming deep yellow above 100° C.

*Analysis.*—Calcd. for $C_{54}H_{56}N_{10}O_{14}S_2$: C, 57.23; H, 4.98. Found: C, 57.69; H, 5.02.

This product was found to contain the β-lactam structure as shown by infrared analysis, to inhibit *Staph. aureus* Smith at a concentration of 0.2 mcg./ml. and to exhibit versus the same organism upon intramuscular injection in mice a $CD_{50}$ of 21 mgm./kg.

(d) 3-methyl-5-(p-nitrophenyl)- 4-isoxazolylpenicillin; the free acid was percipitated as an amorphous solid by adding one drop of 42% $H_3PO_4$ to a solution of about 3 mgm. of the sodium salt in 0.5 ml. water.

(e) Potassium 3 - methyl-5-(p-nitrophenyl)-4-isoxazolylpenicillin, apparently solvated with one molecule tert.-butyl alcohol, sample darkened above 160° C. and rapidly became black above 180° C.

*Analysis.*—Calcd. for $C_{19}H_{17}N_4O_7SK \cdot C_4H_{10}O$: C, 49.45; H, 4.87; N, 10.03. Found: C, 49.9; H, 4.94; N, 9.96.

This product was found to contain the β-lactam structure as shown by infrared analysis, to inhibit *Staph. aureus* Smith at a concentration of 0.4 mcg./ml. and to exhibit versus the same organism upon intramuscular injection in mice a $CD_{50}$ of 23–66 mgm./kg. This product was very active against benzylpenicillin-resistant Staphylococci both in vitro and in vivo.

(7) 3 - methyl-5-(p-chlorophenyl)-4-isoxazolylpenicillin:

(a) 3 - methyl-5-(p-chlorophenyl)-4-isoxazolecarboxylic acid, M.P. 184–186° C. from toluene.

*Analysis.*—Calcd. for $C_{11}H_8ClNO_3$: C, 55.59; H, 3.393. Found: C, 55.75; H, 3.89.

Amide, M.P. 220–222° C., from 95% ethanol.

*Analysis.*—Calcd. for $C_{11}H_9ClN_2O_2$: C, 55.82; H, 3.833; N, 11.84. Found: C, 56.84; H, 4.01; N, 11.9.

(b) 3-methyl-5-(p-chlorophenyl)- 4-isoxazolecarbonyl chloride, M.P. 47–50° C.

(c) N,N' - dibenzylethylenediamine bis-3-methyl-5-(p-chlorophenyl)-4-isoxazolylpenicillin, obtained as a crystalline solid, insoluble in water, soluble in acetone.

(d) Potassium 3-methyl-5-(p-chlorophenyl)-4-isoxazolylpenicillin, obtained as a crystalline solid. This product was very active against benzylpenicillin-resistant Staphylococci both in vitro and in vivo.

Example 20

5-METHYL-3-(p-CHLOROPHENYL)-4-ISOXAZOLYL-PENICILLIN

This product was prepared by replacing benzaldehyde with p-chlorobenzaldehyde in the process described above in detail.

(a) p-Chlorobenzaldehyde oxime, M.P. 104–107° C.

(b) α-p-Dichlorobenzaldoxime (p - chlorobenzhydroximic chloride), M.P. 84–86° C.

*Analysis.*—Calculated for $C_7H_5Cl_2NO$: C, 44.24; H, 2.652; N, 7.37. Found: C, 45.19; H, 2.90; N, 7.30.

(c) 5 - methyl-3-(p-chlorophenyl)-4-isoxazolecarboxylic acid, M.P. 212.5–215° C. from toluene.

*Analysis.*—Calculated for $C_{11}H_8ClNO_3$: C, 55.59; H, 3.393; N, 5.895. Found: C, 55.83; H, 3.52; N, 5.72.

Amide, M.P. 202–204° C.

(d) 5-methyl-3-(p-chlorophenyl)- 4-isoxazole-carbonyl chloride, M.P. 69–70° C.

(e) N,N' - dibenzylethylenediamine bis-5-methyl-3-(p-chlorophenyl)-4-isoxazolylpenicillin, M.P. 140–145° C. with decomposition.

(f) Potassium 5 - methyl-3-(p-chlorophenyl)-4-isoxazolylpenicillin was obtained as a crystalline solid. This product was very active against benzylpenicillin-resistant Staphylococci both in vitro and in vivo.

Example 21

Using the reaction scheme set forth above for the preparation of 5-methyl-3-phenyl-4-isoxazolecarboxylic acid from benzaldehyde and ethyl acetoacetate followed by reaction of the isoxazole acid chloride with 6-aminopenicillanic acid and replacing the ethyl acetoacetate with an equimolar weight of ethyl propionylacetate, ethyl n-butyrylacetate, ethyl n-valerylacetate, ethyl n-heptoylacetate and ethyl isovalerylacetate, respectively, there are produced 3-phenyl-5-ethyl-4-isoxazolylpenicillin, 3-phenyl-5-n-propyl-4-isoxazolylpenicillin, 3-phenyl-5-n-butyl-4-isoxazolylpenicillin, 3 - phenyl-5-n-hexyl-4-isoxazolylpenicillin and 3-phenyl-5-isobutyl-4-isoxazolylpenicillin, respectively.

Example 22

Using the reaction scheme set forth above for the preparation of 5-methyl-3-phenyl-4-isoxazolecarboxylic acid from benzaldehyde and ethyl acetoacetate followed by reaction of the isoxazole acid chloride with 6-aminopenicillanic acid and replacing the benzaldehyde with an equimolar weight of acetaldehyde, propionaldehyde, n-butyraldehyde, isobutyraldehyde, n-valeraldehyde and isovaleraldehyde, respectively, there are produced 3-methyl-5-methyl-4-isoxazolylpenicillin, 3-ethyl-5-methyl-4-isoxazolylpenicillin, 3-n-propyl-5-methyl-4-isoxazolylpenicillin, 3-isopropyl-5-methyl-4-isoxazolylpenicillin, 3 - n - butyl - 5- methyl-4-isoxazolylpenicillin and 3-isobutyl-5-methyl-4-isoxazolylpenicillin, respectively.

Example 23

Using the reaction scheme set forth above for the preparation of 5-methyl-3-phenyl-4-isoxazolecarboxylic acid from benzaldehyde and ethyl acetoacetate followed by reaction of the isoxazole acid chloride with 6-aminopenicillanic acid and replacing the benzaldehyde and the ethyl acetoacetate with equimolar weights of proprionaldehyde and ethyl propionylacetate, of n-butyraldehyde and ethyl n-butyrylacetate, of n-valeraldehyde and ethyl n-valerylacetate, of isovaleraldehyde and ethyl isovalerylacetate, of isobutyraldehyde and ethylpropionylacetate, and of isovaleraldehyde and ethyl propionylacetate, respectively, there are produced 3,5-diethyl-4-isoxazolylpenicillin, 3,5-di-n-propyl-4-isoxazolylpenicillin, 3,5-di-n-butyl-4-isoxazolylpenicillin, 3,5 - di-isobutyl-4-isoxazolylpenicillin, 3-isopropyl-5-ethyl-4-isoxazolylpenicillin and 3-isobutyl-5-ethyl-4-isoxazolylpenicillin, respectively

We claim:

1. A member selected from the group consisting of an acid having the formula

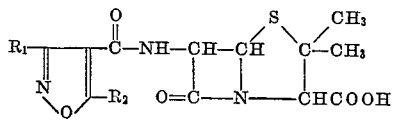

wherein $R_1$ and $R_2$ each represent a member selected from the group consisting of (lower)alkyl, (lower)alkylthio, benzylthio, cyclohexyl, cyclopentyl, cycloheptyl, benzyl, styryl, phenylethyl, phenylpropyl, furyl, thienyl, naphthyl and a member selected from the group consisting of a radical having the formula

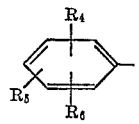

wherein $R_4$, $R_5$ and $R_6$ each represent a member selected from the group consisting of hydrogen, fluoro, chloro, bromo, iodo, trifluoromethyl, (lower)alkyl, (lower)alkoxy, nitro, methylsulfonyl, cyano, di(lower)alkylamino and methylmercapto; and its sodium, potassium, calcium, aluminum and ammonium salts and its nontoxic substituted ammonium salts with amines selected from the group consisting of tri(lower)alkylamines, procaine, dibenzylamine, N-benzyl-beta-phenethylamine, l-ephenamine, N,N' - dibenzylethylenediamine, dehydroabietylamine, N,N'-bis-dehydroabietylethylenediamine and N-(lower)alkylpiperidines.

2. A member selected from the group consisting of an acid having the formula

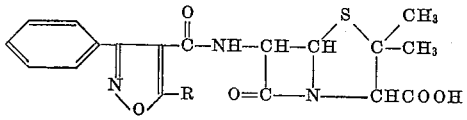

wherein R represents (lower)alkyl.

3. A member selected from the group consisting of an acid having the formula

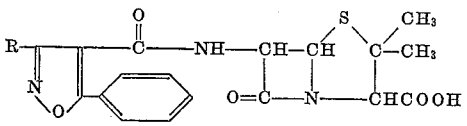

wherein R represents (lower)alkyl.

4. A member selected from the group consisting of an acid having the formula

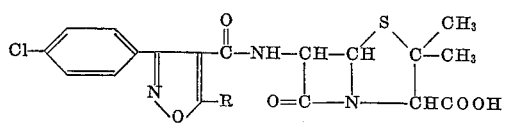

wherein R represents (lower)alkyl.

5. A member selected from the group consisting of an acid having the formula

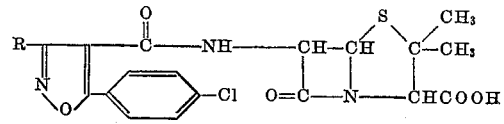

wherein R represents (lower)alkyl.

6. 5-methyl-3-phenyl-4-isoxazolylpenicillin.
7. 3-(p-chlorophenyl)-5-methyl-4-isoxazolylpenicillin.

No references cited.

UNITED STATES PATENT OFFICE

CERTIFICATE OF CORRECTION

Patent No. 2,996,501             August 15, 1961

Frank Peter Doyle et al.

It is hereby certified that error appears in the above numbered patent requiring correction and that the said Letters Patent should read as corrected below.

Column 17, line 14, for "-4-isoxazolecorboxylic", in italics, read -- -4-isoxazolecarboxylic --, in italics; line 30, for "MIBK extracts being discarded. The aqueous phase was" read -- ml. of acetone at 9 to 12°. The reaction mixture was --; column 19, line 16, for "4.2" read -- 4.82 --.

Signed and sealed this 21st day of August 1962.

(SEAL)
Attest:

ESTON G. JOHNSON
Attesting Officer

DAVID L. LADD
Commissioner of Patents